United States Patent Office 3,282,968
Patented Nov. 1, 1966

3,282,968
2,3-DICYANO - 5 - SULFONYL-6-SUBSTITUTED PARA - BENZOQUINONE AND THE CORRESPONDING HYDROQUINONE
Richard M. Scribner, Wilmington, Del., assignor to E. I. du Pont de Nemours and Company, Wilmington, Del., a corporation of Delaware
No Drawing. Filed Jan. 8, 1963, Ser. No. 250,030
13 Claims. (Cl. 260—396)

This invention relates to a new class of Pi or Lewis acids. More specifically, the present invention relates to 2,3-dicyano-5-hydrocarbylsulfonyl and -5-halo-, -5-nitro-, and -5-cyanohydrocarbylsulfonyl-p-benzoquinones, the 6-functionally substituted derivatives thereof, and the corresponding hydroquinones of the above described benzoquinones.

Not only are the compounds of this invention surprisingly strong Pi or Lewis acids, but they are quite unusual oxidizing agents as well. The utility of this invention will be described and illustrated more fully hereinafter.

The new dicyanosulfonyl-p-benzoquinones of the present invention can be represented by the following structural formula:

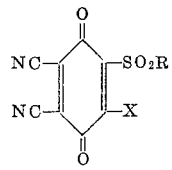

wherein R is a hydrocarbyl, halohydrocarbyl, cyanohydrocarbyl or nitrohydrocarbyl radical free of aliphatic carbon-to-carbon unsaturation, the halogen in said halohydrocarbyl radical being of atomic number 9 through 35, inclusive, i.e., fluorine, chlorine and bromine, and X is hydrogen or a monovalent electronegative substituent such as Cl, Br, F, CN, $NO_2$, $RSO_2$ wherein R is defined as above, and the like. In the alternative X can be defined as H or a group having a Hammett $\sigma_m$ (sigma) constant greater than +0.30. This would include (cf. Jaffe, Chem. Revs., 53, 191 [1953]) the recognized group F, Cl, Br, I, CN, $NO_2$, $CH_3SO_2$, —CHO, —$CO_2H$, —$CF_3$, and —$N(CH_3)_3^+$.

The hydroquinones corresponding to the above-defined dicyanosulfonyl-p-benzoquinones are also included within the scope of the present invention and can be represented by the structural formula

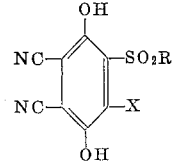

wherein R and X each has the same meaning as previously disclosed.

Specifically included within this invention are compounds of the above structural formulae wherein R is a monovalent alkyl, aryl, alkaryl, aralkyl or cycloalkyl hydrocarbon radical or a halo-, cyano-, or nitro-substituted alkyl, aryl, alkaryl, aralkyl or cycloalkyl radical wherein the halogen substituents are of atomic number 9 through 35, inclusive, and wherein R contains no more than eight carbon atoms. A preferred embodiment comprises those compounds wherein R is an alkyl, aralkyl, aryl, cyanoaryl, haloaryl or nitroaryl radical containing no more than eight carbon atoms. More preferred yet are those compounds just-described wherein R contains no more than six carbon atoms.

The 2,3-dicyano-5-sulfonyl-1,4-benzoquinones and 6-electronegatively substituted derivatives thereof, as well as the corresponding 1,4-hydroquinones are easily prepared by the direct condensation between 2,3-dicyano-1,4-benzoquinone (Formula I) and the requisite sulfinic acid which affords the desired unsubstituted 2,3-dicyano-5-sulfonyl-1,4-hydroquinone. The latter (Formula II) is directly oxidized in one step to the corresponding 1,4-benzoquinone (Formula III), which in turn can be readily converted in one additional step by conventional stoichiometry to whatever 6-electronegatively substituted derivatives are desired, the direct product of such further conversion being the 2,3-dicyano-5-sulfonyl-6-electronegatively substituted-1,4-hydroquinone (Formula IV). This compound is readily oxidized in a simple, single-step reaction to the desired 1,4-benzoquinone (Formula V). Alternatively, the dicyanobenzoquinone can be first converted to the desired 6-electronegatively substituted derivative, oxidized to the corresponding quinoid structure, converted to the desired benzenoid sulfonyl derivative by direct condensation with the requisite sulfinic acid, and further oxidized to the final dicyanosulfonylquinone product. These synthetic steps are illustrated by the following equations:

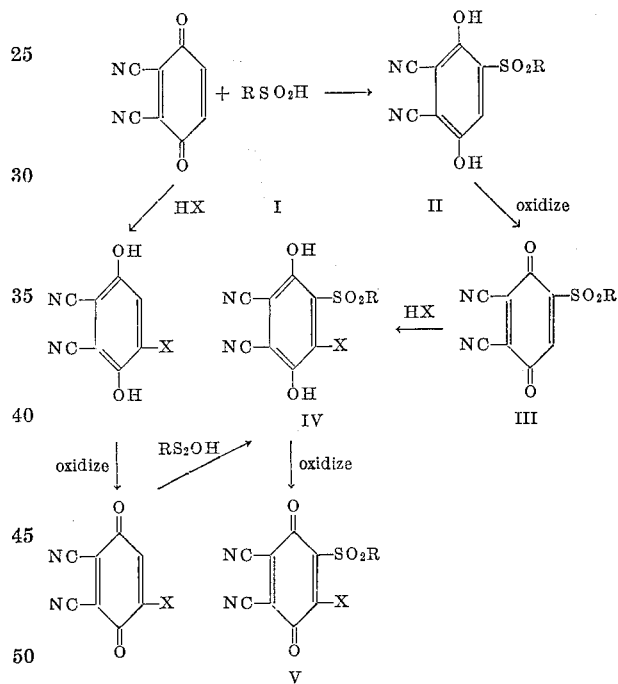

where R and X have their previously indicated meanings.

The term "hydrocarbyl," as used throughout this disclosure, is consistent with chemical nomenclature and is synonymous with the term "hydrocarbon radical." In a like manner, the terms "halohydrocarbyl," "cyanohydrocarbyl" and "nitrohydrocarbyl" are synonymous with "halohydrocarbon radical," "cyanohydrocarbon radical" and "nitrohydrocarbon radical" respectively. Thus, the hydrocarbyl, halohydrocarbyl, cyanohydrocarbyl and nitrohydrocarbyl groups represented by R in the starting materials and products indicated above can be any radical free of aliphatic carbon-to-carbon unsaturation and consisting either of carbon and hydrogen solely or of carbon, hydrogen and a halo-, cyano-, or nitro-substituent.

The 2,3-dicyano-5-hydrocarbylsulfonyl- and -cyano-, -halo-, and -nitrohydrocarbylsulfonyl-1,4-benzoquinones and -1,4-hydroquinones and the corresponding 6-electronegatively substituted derivatives of the present invention and the processes for the preparation thereof are further illustrated in the following detailed examples in which the parts given are by weight. These examples also illustrate the utility of these new compounds, particularly in forming charge-transfer compounds with Lewis bases.

*Example I*

A mixture of 130 parts of phenylsulfinic acid sodium salt dihydrate and 100 parts of distilled water was agitated vigorously while a solution of 19 parts of concentrated sulfuric acid in 200 parts of ice water was added. The resulting suspension of phenylsulfinic acid in aqueous acid was extracted twice with 300-part portions of purified acetonitrile. The combined acetonitrile extracts were then cooled in an ice/water bath and stirred vigorously under an atmosphere of nitrogen while a solution of 55 parts of 2,3-dicyanoquinone in 500 parts of purified acetonitrile was added dropwise over a period of 30 minutes. The dark reaction mixture was allowed to stand at room temperature overnight and then evaporated under reduced pressure until the residue solidified. The resulting solid was triturated with 1,000 parts of water and collected by filtration. It was then mixed with 1700 parts of fresh water and solid sodium bicarbonate was added until effervescence stopped. The resulting alkaline solution was heated to boiling and filtered hot. On standing overnight at room temperature, the solution deposited 13.0 parts (6% of theory) of the monosodium salt of 2,3-dicyano-5,6-bis(phenylsulfonyl)-1,4-hydroquinone as yellow needles.

Recrystallization of the crude monosodium salt of 2,3-dicyano-5,6-bis(phenylsulfonyl)hydroquinone from dilute sodium bicarbonate gave yellow needles, dec. 240–250° C.

*Analysis.*—Calcd. for $C_{20}H_{11}S_2O_6N_2Na$: C, 51.9%; H, 2.9%; N, 6.1%; S, 13.9%; Na, 5.0%. Found: C, 52.1%; H, 2.8%, N, 6.2%; S, 13.9%; Na, 4.6%. The infrared spectrum of this salt shows bands at 2.8 and 2.95$\mu$ (OH), 4.49$\mu$ (C≡N), 6.03, 6.27, 6.51, and 6.65$\mu$ (C=C), 7.3, and 8.72$\mu$ (sulfonyl). An aqueous solution absorbs in the ultraviolet region at 402 m$\mu$ (k.=20.1) and 248 m$\mu$ (k.=54.6).

Action of $N_2O_4$ on a suspension of the sodium salt in $CHCl_3$ gave the conjugate acid, 2,3-dicyano-5,6-bis-(phenylsulfonyl)hydroquinone, which crystallized as white, chunky crystals from benzene, M.P. 202–203.5° C.

*Analysis.*—Calcd. for $C_{20}H_{12}N_2S_2O_6$: C, 54.5%; H, 2.8%; N, 6.4%; S, 14.6%; N.E., 440; Active Hydrogen, 0.46. Found: C, 55.0%; H, 2.8%; N, 6.4%; S, 14.6%; N.E., 451 (pK$_a$ 2.92 in 90% alcohol); Active hydrogen (in "glyme"), 0.39, 0.40.

The resulting aqueous filtrate from the above original isolation of the bis(phenylsulfonyl) sodium salt was acidified with dilute aqueous sulfuric acid to about pH 1 and then extracted with three 350-part portions of ethyl acetate. The ethyl acetate extracts were combined, washed once with about 300 parts of water, and then dried over anhydrous magnesium sulfate. The dried ethyl acetate extracts were evaporated under reduced pressure, and there was thus obtained 106 parts of solid product. This material was crystallized in four portions from 90 parts of hot water acidified with one part of concentrated hydrochloric acid. There was thus obtained after filtration and drying 96 parts (62% of theory) of 2,3-dicyano-5-phenylsulfonyl-1,4-hydroquinone as light tan needles. Recrystallization from the same proportion water/concentrated hydrochloric acid mixture using a commercially available decolorizing charcoal afforded colorless needles melting at 207–211° C. with decomposition. An analytical sample of the 2,3-dicyano-5-phenylsulfonyl-1,4-hydroquinone was prepared by further recrystallization from an approximate 5/2/1 parts by volume ethyl acetate/benzene/cyclohexane mixture.

*Analysis.*—Calcd. for $C_{14}H_8N_2SO_4$: C, 56.0%; H, 2.7%; N, 9.3%; S, 10.7%. Found: C, 55.6%; H, 2.8%; N, 9.5%; S, 11.0%.

The conjugate base of this relatively strong acid exhibits blue-green fluorescence in water and polar organic solvents. A solution of the quinol in acetonitrile cannot be oxidized polarographically at potentials up to 1.14 volts. It does undergo one electron reduction at −1.13 volts and at −1.40 volts.

Infrared analysis (KBr) shows bands at 3.0$\mu$ (OH), 4.46$\mu$ (conj. C≡N), 6.20$\mu$, 6.30$\mu$ (aromatic conjugation), and 7.45$\mu$, 7.62$\mu$, 7.75$\mu$, 8.76$\mu$, and 8.86$\mu$ (hydrogen bonded sulfonyl). The ultraviolet absorption spectrum shows $\lambda_{max.}^{CH_3CN}$ 364 m$\mu$ ($\epsilon$=8,850), $\lambda_{max.}^{CH_3CN}$ 260 m$\mu$ ($\epsilon$=10,000) and $\lambda_{max.}^{CH_3CN}$ 235 m$\mu$ ($\epsilon$=20,000)

*Example II*

Commercially available methylene chloride was purified by washing with concentrated sulfuric acid, followed by distillation over $P_2O_5$ after storage for at least one day over the latter compound. Fifteen parts of the above 2,3-dicyano-5-phenylsulfonyl-1,4-hydroquinone was stirred in 75 parts of the thus purified methylene chloride while about 20 parts of $N_2O_4$ was added over a period of about 30 minutes. The mixture was stirred for an additional 15 minutes and the solid then removed by filtration. The yellow filter cake was washed with two 35-part portions of diethyl ether, and, after drying, there was thus obtained 13 parts (87% of theory) of 2,3-dicyano-5-phenylsulfonyl-1,4-(or -p-)benzoquinone as yellow crystals melting at 222–225° C. Evaporation of the methylene chloride filtrate afforded an additional two-part portion of crude 2,3-dicyano-5-phenylsulfonyl-p-benzoquinone. Recrystallization of the major product from a 5/1 parts of volume benzene/cyclohexane mixture afforded an analytically pure sample as red crystals, which on prolonged drying at 78° C. under a pressure corresponding to 0.3 mm. of mercury lost benezene, became yellow-orange in color, and finally exhibited a melting point of 225–227° C. with decomposition.

*Analysis.*—Calcd. for $C_{14}H_6N_2SO_4$: C, 56.4%; H, 2.0%; N, 9.4%; S, 10.8%. Found: C, 56.5%; H, 2.1%; N, 9.6%; S, 10.7%.

*Example III*

To a stirred, ice-cold solution of 2.5 parts of benzenesulfinic acid in absolute ethyl alcohol (acetonitrile works as well) was added 1.7 parts of the above 2,3-dicyano-5-phenylsulfonyl - 1,4 - benzoquinone. The mixture was stirred while cold for 10 minutes and then at room temperature for about 35 minutes. Evaporation of the reaction mixture under reduced pressure to about five parts gave a yellow, mushy solid that was washed with 140 parts of water and collected by filtration. This solid was recrystallized as yellow needles from 75 parts of hot water almost saturated with sodium bicarbonate. Recrystallization from 45 parts of water containing 2.5 parts sodium bicarbonate gave 0.90 part of the pure sodium salt of 2,3-dicyano-5,6-bis(phenylsulfonyl)-1,4-hydroquinone, identical to that obtained in Example I.

*Example IV*

Gaseous hydrogen chloride was bubbled through a stirred mixture of about 12 parts of the above 2,3-dicyano-5-phenylsulfonyl-p-benzoquinone in 150 parts of benzene, maintained at room temperature for one hour, and then heated to 60° C. for 15 minutes. The reaction mixture, originally cherry red, changed to light orange in color, and then was allowed to cool to room temperature and filtered. The resultant solid filter cake was recrystallized from about 100 parts of nitromethane to afford 13 parts of needles. Recrystallization from nitromethane afforded a pure product melting at 231–232° C. with decomposition. Infrared analyses indicated that this crude 5-chloro - 2,3 - dicyano-6-phenylsulfonyl-1,4-hydroquinone contained some of the nonchlorinated product, i.e., reduced starting material (2,3-dicyano-5-phenylsulfonyl-1,4-hydroquinone). A further recrystallization of this partially contaminated product on a basis of one part thereof in 2500 parts of water containing 20 parts of concentrated hydrochloric acid afforded 0.6 part for each 1.0 part of crude material so recrystallized of pure 5-chloro-2,3-dicyano-6-phenylsulfonyl-1,4-hydroquinone as stable, colorless needles melting at 240–241° C. with decomposition.

*Analysis.*—Calcd. for $C_{14}H_7ClN_2SO_4$: C, 50.2%; H, 2.1%; Cl, 10.6%; N, 8.4%. Found: C, 50.4%; H, 2.4%; Cl, 10.6%; N, 8.3%.

Example V

In the lower bulb of a crystallization assembly of the type described at page 36 of vol. 6 of "Technique of Organic Chemistry" under the subheading "Micro and Semimicro Methods," Interscience, 1954, was placed about 4 parts of purified methylene chloride and 0.5 part of the above 5 - chloro-2,3-dicyano-6-phenylsulfonyl-1,4-hydroquinone. A solution of about one part of $N_2O_4$ in one part of methylene chloride was then forced into the bulb under nitrogen pressure. After 15 minutes, the crystallization assembly was inverted and the yellow quinone was collected by filtration under nitrogen pressure. The resultant 5 - chloro-2,3-dicyano-6-phenylsulfonyl-p-benzoquinone was washed with 2–3 parts of fresh methylene chloride and then with about three parts of dry diethyl ether. After drying over $P_2O_5$ at 78° C. under a pressure corresponding to 0.3 mm. of mercury, the purified 5-chloro-2,3-dicyano-6-phenylsulfonyl-p-benzoquinone was obtained as bright yellow crystals melting at 231–233° C. with decomposition.

*Analysis.*—Calcd. for $C_{14}H_5N_2SO_4Cl$: C, 50.4%; H, 1.5%; N, 8.4%; Cl, 10.7%. Found: C, 50.0%; H, 1.8%; N, 8.6%; Cl, 10.7%.

Example VI

To a boiling saturated solution of 0.298 part of the above 2,3-dicyano-5-phenylsulfonyl-p-benzoquinone in 15 parts of benzene was added 0.202 part (an equimolar proportion) of pyrene. On slowly cooling over a period of three hours to room temperature, the dark solution gradually deposited black crystals which were collected by filtration, washed with benzene, and dried at 25° C. under a pressure corresponding to 0.1 mm. of mercury. The thus obtained black crystals of the 1/1 2,3-dicyano-5-phenylsulfonyl - p - benzoquinone/pyrene charge-transfer complex comprised 0.25 part (50% of theory) and exhibited a weak epr signal. The compaction resistivity of the charge-transfer complex was $1.5 \times 10^{13}$ ohm-cm. as obtained by a two-probe technique.

*Analysis.*—Calcd. for $C_{30}H_{16}N_2SO_4$: C, 72.1%; H, 3.2%; N, 5.6%. Found: C, 71.8%; H, 3.4%; N, 5.7%.

As illustrated in the foregoing detailed examples, the new 2,3-dicyano-5-hydrocarbylsulfonyl and cyanohydrocarbyl-, halohydrocarbyl- and nitrohydrocarbylsulfonyl hydroquinones can be prepared directly in one step from the starting 2,3-dicyano-1,4-benzoquinone by direct metathesis with the requisite sulfinic acid to produce the desired 2,3 - dicyano - 5 - sulfonyl-substituted 1,4-hydroquinones. These in turn can be directly oxidized to the desired corresponding 2,3-dicyano-5-sulfonyl-substituted 1,4-hydroquinones. The latter in turn can be directly converted by suitable, e.g. metathetical, reactions to the desired 2,3-dicyano-5-sulfonyl-substituted 6-electronegatively substituted 1,4-hydroquinones. These in turn, like the corresponding 2,3-dicyano-5-sulfonyl-substituted 1,4-hydroquinones, can be easily converted to a simple oxidation reaction to the corresponding 2,3-dicyano-5-sulfonyl-substituted 6-electronegatively substituted 1,4-benzoquinones.

More particularly, the 2,3-dicyano-5-hydrocarbylsulfonyl- or 5-cyano-, 5-nitro-, or 5-halohydrocarbylsulfonyl-1,4-hydroquinones are prepared by mixing a solution of 2,3-dicyano-1,4-benzoquinone in an inert solvent, such as acetone, ethyl acetate, benzene, nitromethane, or acetonitrile, with the appropriate sulfinic acid, likewise dissolved in an inert solvent. Preferably the solution of the quinone is added slowly to an excess of the sulfinic acid maintained at about 0° C., although the reaction can in some cases be carried out at temperatures ranging from −10° C. to 100° C. After addition of the quinone has been completed, the reaction mixture is allowed to stand at about 25° C. for at least 10 minutes to one hour, or alternatively it may be heated to 30–100° C. to complete reaction. From the crude reaction mixture, pure 2,3-dicyano-5-hydrocarbylsulfonyl- or 5-cyanohydrocarbyl-, 5-nitrohydrocarbyl, or 5-halohydrocarbylsulfonyl - 1,4 - hydroquinones are isolated by an appropriate procedure chosen from the usual techniques employed in organic synthesis, e.g., by crystallization from solvents or solvent-pairs, selective extraction, sublimation, distillation, etc.

The 2,3-dicyano-5-hydrocarbylsulfonyl- or 5-cyano-, 5-nitro-, or 5-halohydrocarbyl-1,4-hydroquinones can be oxidized to the 2,3-dicyano-5-cyano-, -5-nitro-, or -5-halohydrocarbylsulfonyl-1,4-benzoquinones by several of the many oxidizing agents commonly employed in organic chemistry (cf. for example, "Synthesis of Benzoquinones by Oxidation," by James Cason, in "Organic Reactions," Wiley, N.Y., 1948, pages 305–361). Dinitrogen tetroxide is especially convenient for this purpose. A suspension or solution of the hydroquinone in a solvent resistant to oxidation, such as $CCl_4$, $CHCl_3$, $CH_2Cl_2$, benzene, or acetone, is treated with $N_2O_4$ at a temperature ranging from −10° to 100° C., but ordinarily close to 25° C. Reaction is indicated by effervescence due to generation of the more volatile oxides of nitrogen and is accompanied by a color change as the ordinarily colorless hydroquinone is converted to the ordinarily colored quinone. The 2,3-dicyano-5-hydrocarbylsulfonyl-, 5-cyano-, 5-nitro-, 5-halohydrocarbylbenzoquinone is then isolated either by filtration, if it is insoluble in the reaction medium, or by evaporation of the volatile oxides of nitrogen and solvent.

Preparation of the 2,3-dicyano-5-hydrocarbylsulfonyl-, 5-cyano-, 5-nitro-, or 5-halocarbylsulfonyl-6-negatively substituted 1,4-hydroquinones is accomplished by addition of an excess of the appropriate acid HX to the preceding quinones. The reaction is preferably carried out in non-polar solvents such as benzene or toluene, but a polar solvent such as acetone, acetonitrile, or acetic acid may be employed, either at −10 to 25° C., or, sometimes preferably, at the boiling point of the chosen solvent. The time required for completion of the reaction is judged by change of the characteristic color of the quinone to the colorless or almost colorless hydroquinone. When a nonpolar solvent such as benzene is employed, the hydroquinone is isolated from the reaction mixture, in which it is quite insoluble, simply by filtration.

Preparation of the 2,3-dicyano-5-hydrocarbylsulfonyl, 5-cyano-, 5-nitro-, or 5-halohydrocarbylsulfonyl-6-negatively substituted 1,4-hydroquinones can also be accomplished by addition of the appropriate 2,3-dicyano-5-negatively substituted 1,4-benzoquinone to the appropriate sulfinic acid. This reaction is carried out in the manner described above for reacting sulfinic acids with benzoquinones.

Oxidation of the 2,3-dicyano-5-hydrocarbylsulfonyl-, 5-cyano-, 5-nitro-, or 5-halohydrocarbylsulfonyl-6-negatively substituted 1,4-hydroquinones to the corresponding 1,4-benzoquinones can be accomplished in the same manner as the oxidation of 2,3-dicyano-5-hydrocarbyl-, 5-cyano-, 5-nitro-, or 5-halohydrocarbylsulfonyl-1,4-hydroquinones described above.

The foregoing detailed examples have illustrated the invention in certain specific areas. Using the same process conditions and the following specifically enumerated coreactants, the invention in its full scope is still further illustrated in the following discussion:

In the manner of Example I, using methanesulfinic acid (Bazlen, Ber. 60, 1479 (1927)) and 2,3-dicyano-1,4-benzoquinone, there will be obtained 2,3-dicyano-5-methylsulfonyl-1,4-hydroquinone which, on oxidation with, e.g., $N_2O_4$, can be converted in one step to 2,3-dicyano-5-methylsulfonyl-1,4-benzoquinone. The latter, on addition of hydrogen fluoride, affords in a single step the desired 2,3-dicyano-6-fluoro - 5 - methylsulfonyl - 1,4 - hydroquinone, which on oxidation, e.g. with $N_2O_4$, affords 2,3-dicyano-6-fluoro-5 - methylsulfonyl - 1,4 - benzoquinone. Similarly, substituting hydrogen chloride for hydrogen fluoride, there will be obtained the desired 6-chloro-2,3-dicyano-5-methylsulfonyl-1,4-hydroquinone, which on oxidation, e.g. with $N_2O_4$, affords 6-chloro-2,3-dicyano-5-methylsulfonyl-1,4-benzoquinone. Similarly, substituting hydrogen cyanide for the hydrogen chloride, there will be obtained 2,3,6-tricyano-5-methylsulfonyl-1,4 - hydroquinone, which on oxidation, e.g. with $N_2O_4$, affords 2,3,6-tricyano-5-methylsulfonyl-1,4-benzoquinone.

In the manner of Example I, using 1-dodecanesulfinic acid (Marvel, Johnson, J.O.C. 13, 822 (1948)) and 2,3-dicyano-1,4-benzoquinone, there will be obtained 2,3-dicyano-5-[1'-dodecylsulfonyl]-1,4-hydroquinone which, on oxidation with, e.g. $N_2O_4$, can be converted in one step to 2,3-dicyano-5-[1'-dodecylsulfonyl]-1,4-benzoquinone. The latter, on addition of methanesulfinic acid, affords in a single step the desired 2,3-dicyano-5-[1'-dodecylsulfonyl] - 6 - methylsulfonyl - 1,4-hydroquinone, which on oxidation, e.g. with $N_2O_4$, affords 2,3-dicyano-5-[1'-dodecylsulfonyl] - 6 - methylsulfonyl - 1,4 - benzoquinone. Similarly, substituting hydrogen bromide for the methanesulfinic acid, there will be obtained 6-bromo-2,3 - dicyano - 5 - [1'-dodecylsulfonyl]-1,4-hydroquinone, which on oxidation, e.g. with $N_2O_4$, affords 6-bromo-2,3-dicyano - 5 - [1' - dodecylsulfonyl] - 1,4 - benzoquinone. Similarly, substituting hydrogen cyanide for hydrogen bromide, there will be obtained 2,3,6-tricyano-5-[1'-dodecylsulfonyl]-1,4-hydroquinone, which on oxidation, e.g. with $N_2O_4$, affords 2,3,6-tricyano-5-[1'-dodecylsulfonyl]-1,4-benzoquinone.

In the manner of Example I, using 3-methylcyclohexanesulfinic acid (Borsche and Lange, Ber. 40, 2220 (1907)) and 2,3-dicyano-1,4-benzoquinone, there will be obtained 2,3-dicyano-5-[3'-methylcyclohexylsulfonyl]-1,4-hydroquinone which, on oxidation with, e.g. $N_2O_4$, can be converted in one step to 2,3-dicyano-5-[3'-methylcyclohexylsulfonyl]-1,4-benzoquinone. The latter, on addition of hydrogen chloride, affords in a single step the desired 6-chloro-2,3-dicyano-5-[3'-methylcyclohexylsulfonyl]-1,4-hydroquinone, which on oxidation, e.g. with $N_2O_4$, affords 6 - chloro-2,3-dicyano-5-[3'-methylcyclohexylsulfonyl]-1,4-benzoquinone.

In the manner of Example I, using p-toluenesulfinic acid and 2,3-dicyano-1,4-benzoquinone, there will be obtained 2,3 - dicyano-5-p-tolylsulfonyl - 1,4-hydroquinone which, on oxidation with, e.g. $N_2O_4$, can be converted in one step to 2,3-dicyano-5-p-tolylsulfonyl-1,4-benzoquinone. The latter, on addition of hydrogen chloride, affords in a single step 6-chloro-2,3-dicyano-5-p-tolylsulfonyl-1,4-hydroquinone, which on oxidation, e.g. with $N_2O_4$, affords 6-chloro-2,3-dicyano-5-p-tolylsulfonyl-1,4-benzoquinone.

In the manner of Example I, using p-chlorobenzene sulfinic acid (Kulka, J.A.C.S. 72, 1215 (1950)) and 2,3-dicyano-1,4-benzoquinone, there will be obtained 2,3-dicyano-5-p-chlorophenylsulfonyl-1,4-hydroquinone which, on oxidation with, e.g. $N_2O_4$, can be converted in one step to the 2,3 - dicyano-5-p-chlorophenylsulfonyl-1,4-benzoquinone. The latter, on addition of hydrogen bromide, affords in a single step 6-bromo-2,3-dicyano-5-p-chlorophenylsulfonyl-1,4-hydroquinone, which on oxidation, e.g. with $N_2O_4$, affords 6-bromo-2,3-dicyano-5-p-chlorophenylsulfonyl-1,4-benzoquinone.

In the manner of Example I, using p-cyanobenzenesulfinic acid (Cymerman et al., J. Chem. Soc. 1949, 381) and 2,3-dicyano-1,4-benzoquinone, there will be obtained 2,3-dicyano - 5 - p-cyanophenylsulfonyl-1,4-hydroquinone which, on oxidation with, e.g. $N_2O_4$, can be converted in one step to 2,3-dicyano-5-p-cyanophenylsulfonyl-1,4-benzoquinone. The latter, on addition of hydrogen cyanide, affords in a single step 2,3,6-tricyano-5-p-cyanophenylsulfonyl-1,4-hydroquinone, which on oxidation, e.g. with $N_2O_4$, affords 2,3,6-tricyano-5-p-cyanophenylsulfonyl-1,4-benzoquinone.

In the manner of Example I, using p-nitrobenzenesulfinic acid (Zincke and Lenhardt, Ann. 400, 15 (1913)) and 2,3-dicyano-1,4-benzoquinone, there will be obtained 2,3 - dicyano-5-p-nitrophenylsulfonyl - 1,4-hydroquinone, which on oxidation with, e.g. $N_2O_4$, can be converted in one step to 2,3-dicyano-5-p-nitrophenylsulfonyl-1,4-benzoquinone. The latter, on addition of hydrogen fluoride, affords in a single step 2,3-dicyano-6-fluoro-5-p-nitrophenylsulfonyl-1,4-hydroquinone, which on oxidation, e.g. with $N_2O_4$, affords the 2,3-dicyano-6-fluoro-5-p-nitrophenylsulfonyl-1,4-benzoquinone.

In the manner of Example I, using phenylmethanesulfinic acid (Holmberg, Arkin Kemi, Mineral. Geol. 14A, No. 8, p. 13 (1944)) and 2,3-dicyano-1,4-benzoquinone, there will be obtained 2,3-dicyano-5-benzylsulfonyl-1,4-hydroquinone, which on oxidation with, e.g. $N_2O_4$, can be converted in one step to 5-benzylsulfonyl-2,3-dicyano-1,4-benzoquinone. The latter, on addition of hydrogen cyanide, affords in a single step the desired 5-benzylsulfonyl-2,3,6-tricyano-1,4-hydroquinone, which on oxidation, e.g. with $N_2O_4$, affords 5-benzylsulfonyl-2,3,6-tricyano-1,4-benzoquinone.

In the manner of Example III, using methanesulfinic acid and 2,3-dicyano-5-methylsulfonyl-1,4-benzoquinone, previously prepared by reaction of 2,3-dicyano-1,4-benzoquinone and methanesulfinic acid, there will be obtained 2,3 - dicyano - 5,6-bis(methylsulfonyl)-1,4-hydroquinone, oxidation of which, e.g. with $N_2O_4$, affords 2,3-dicyano-5,6-bis(methylsulfonyl)-1,4-benzoquinone.

In the manner of Example III, using 1-dodecanesulfinic acid and 5-chloro-2,3-dicyano-1,4-benzoquinone, previously prepared by reaction of 2,3-dicyano-1,4-benzoquinone and hydrogen chloride, there will be obtained 6-chloro-2,3 - dicyano-5-[1'-dodecylsulfonyl] - 1,4-benzoquinone, oxidation of which, e.g. with $N_2O_4$, affords 6-chloro-2,3-dicyano-5[1'-dodecylsulfonyl]-1,4-benzoquinone.

In the manner of Example III, using 1-dodecanesulfinic acid and 2,3-dicyano-5-dodecylsulfonyl-1,4-benzoquinone, previously prepared by reaction of 2,3-dicyano-1,4-benzoquinone and 1-dodecanesulfinic acid, there will be obtained 2,3-dicyano - 5,6 - bis[1' - dodecylsulfonyl] - 1,4-hydroquinone, oxidation of which, e.g. with $N_2O_4$, affords 2,3 - dicyano - 5,6 - bis[1' - dodecylsulfonyl] - 1,4 - benzoquinone.

In the manner of Example III, using p-cyanobenzenesulfinic acid and 5-chloro-2,3-dicyano-1,4-benzoquinone, previously prepared by reaction of 2,3-dicyano-1,4-benzoquinone and hydrogen chloride, there will be obtained 6-chloro - 2,3 - dicyano - 5-(p-cyanophenylsulfonyl)-1,4-hydroquinone, oxidation of which, e.g. with $N_2O_4$, affords 6 - chloro - 2,3 - dicyano-5-(p-cyanophenylsulfonyl)-1,4-benzoquinone.

In the manner of Example III, using p-cyanobenzenesulfinic acid and 2,3-dicyano-5-p-cyanophenylsulfonyl-1,4-benzoquinone, previously prepared by reaction of 2,3-dicyano-1,4-benzoquinone and p-cyanobenzenesulfinic acid, there will be obtained 2,3-dicyano-5,6-bis(p-cyanophenylsulfonyl)-1,4-hydroquinone, oxidation of which, e.g. with $N_2O_4$, affords 2,3-dicyano-5,6-bis(p-cyanophenylsulfonyl)-1,4-benzoquinone.

In the manner of Example III, using p-nitrobenzenesulfinic acid and 5-chloro-2,3-dicyano-1,4-benzoquinone, previously prepared by reaction of 2,3-dicyano-1,4-benzoquinone and hydrogen chloride, there will be obtained 6 - chloro - 2,3-dicyano-5-p-nitrophenylsulfonyl-1,4-hydroquinone, oxidation of which, e.g. with $N_2O_4$, affords 6-chloro - 2,3 - dicyano - 5-p-nitrophenylsulfonyl-1,4-benzoquinone.

In the manner of Example III, using p-nitrobenzenesulfinic acid and 2,3-dicyano-5-p-nitrophenyl-sulfonyl-1,4-benzoquinone, previously prepared by reaction of 2,3- dicyano-1,4-benzoquinone and p-nitrobenzenesulfinic acid, there will be obtained 2,3-dicyano-5,6-bis(p-nitrophenylsulfonyl)-1,4-hydroquinone, oxidation of which, e.g. with $N_2O_4$, affords 2,3-dicyano-5,6-bis(p-nitrophenylsulfonyl)-1,4-benzoquinone.

In the manner of Example III, using 3,4-dichlorobenzenesulfinic acid and 2,3-dicyano-5-(3',4'-dichlorophenylsulfonyl)-1,4-benzoquinone, previously prepared by reaction of 2,3-dicyano-1,4-benzoquinone and 3,4-dichlorobenzenesulfinic acid, there will be obtained 2,3-dicyano-5,6 - bis(3',4'-dichlorophenylsulfonyl)-1,4-hydroquinone, oxidation of which, e.g. with $N_2O_4$, affords 2,3-dicyano-5,6-bis(3',4'-dichlorophenylsulfonyl)-1,4-benzoquinone.

These new 2,3-dicyano-5-hydrocarbylsulfonyl and -5-cyano-, -5-nitro-, and -5-halohydrocarbylsulfonyl-1,4-benzoquinones and 6-electronegatively substituted benzoquinones and the corresponding hydroquinones are useful as high-energy fuels, e.g., as rocket propellants and the like. More specifically, copper tubes, about 5 cm. long and 0.5 cm. diameter, closed at one end only, were fabricated from copper foil and then packed with test propellant mixtures. A loaded tube was then placed in a sling fabricated from copper wire which in turn was hung at the end of about 12 inches of string. Ignition of the propellant mixture by means of a flame caused the propellants to burn vigorously with intense light and to propel the tube along a radial path. The following representative compounds were tested. In each case the test propellant was composed of about 0.3 g. powdered compound mixed with an equal weight of potassium perchlorate as oxidant:

(1) 2,3-dicyano-5-phenylsulfonyl - p - benzoquinone of Example II. This moved the copper tube about 6″.

(2) 2,3-dicyano-5,6-bis(phenylsulfonyl) - 1,4 - hydroquinone of Examples I and III. This moved the copper tube about 8″.

(3) 2,3-dicyano-5,6-bis(phenylsulfonyl) - 1,4 - hydroquinone, monosodium salt, of Example I. This moved the copper tube about 3″.

(4) 6-chloro-2,3-dicyano-5-phenylsulfonyl-1,4 - hydroquinone of Example V. This moved the copper tube about 10″.

These new 2,3-dicyano-5-hydrocarbylsulfonyl- and 5-cyano-, 5-nitro-, and 5-halohydrocarbylsulfonyl-1,4-benzoquinones and the corresponding 6-electronegatively substituted benzoquinones are surprisingly strong Pi acids. For instance, both the 2,3-dicyano-5-phenylsulfonyl-1,4-benzoquinone of Example II and the 6-chloro-2,3-dicyano-5-phenylsulfonyl-1,4-benzoquinone of Example V exhibit much higher association constants with respect to pyrene than the previously known strong Pi acid, tetracyanoethylene (TCNE). More specifically, the association constant of TCNE with pyrene is 30; whereas, the association constants for the products of Examples II and V are, respectively, 57 and 108, both with respect to pyrene.

The quinones of Examples II and V are unusual oxidizing agents. In nonaqueous solvents both are reduced by iodide or bromide ions to the corresponding ion-radicals. The latter is likewise reduced by chloride ion. There is no account in the literature of quinones which have been shown to be strong enough oxidizing agents to oxidize chloride ion. Polarographic halfwave potentials for the reduction of these quinones in $CH_3CN/LiClO_4$ are 0.52 V and 0.62 V vs. SCE, respectively. This compares with 0.2 V for chloranil and 0.5 V for 2,3-dicyano-5,6-dichloro-p-benzoquinone. Like other negatively substituted quinones, these appear to oxidize organic compounds by a process involving hydride (H—) transfer.

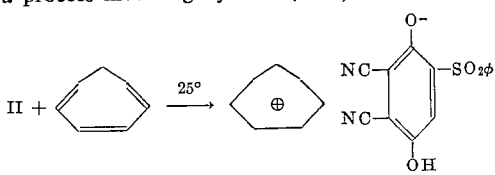

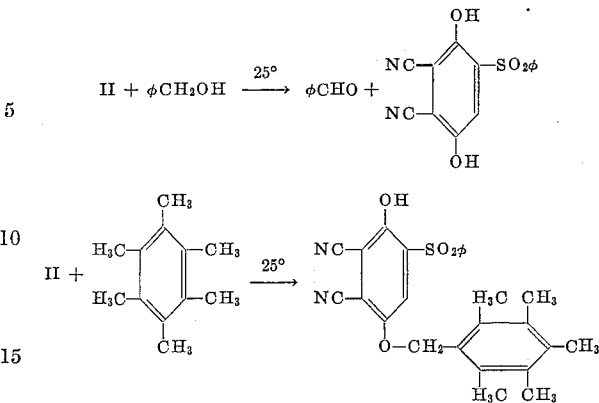

The hydrocarbyl- and cyano-, halo-, and nitrocarbylsulfonylquinones of the present invention exhibit outstandingly high redox potentials as measured by comparison of the first (highest) halfwave potential from polarographic reduction. Thus, as measured using acetonitrile as the solvent, lithium perchlorate as the electrolyte against a dropping mercury electrode, the following results were obtained.

| Compound: | $E_{1/2}°$ first |
|---|---|
| 1,4-benzoquinone | ~—0.15. |
| Tetrachloro-1,4-benzoquinone | ~0.2. |
| 2,3-dicyano-1,4 benzoquinone | 0.31. |
| 5-chloro-2,3-dicyano-1,4-benzoquinone | 0.41. |
| 2,3-dicyano - 5,6 - dichloro-1,4-benzoquinone | 0.5. |
| 2,3-dicyano - 5 - phenylsulfonyl-1,4-benzoquinone | 0.52, 0.57 (graphite electrode). |
| 5-chloro-2,3 - dicyano-6-phenylsulfonyl-1,4-benzoquinone | 0.62 (graphite electrode). |
| Hexacyanobutadiene | 0.62 (graphite electrode). |

The present quinones are useful as free-radical polymerization inhibitors, and the corresponding hydroquinones are useful as oxidation inhibitors. The quinones, because of their high oxidation potential, are useful for dehydrogenating organic molecules such as steroids in the manner of Agnello et al., J. Am. Chem. Soc. 79, 1257 (1957), and also Graber et al., J. Org. Chem. 26, 4774 (1961).

As many widely different embodiments of this invention may be made without departing from the spirit and scope thereof, it is to be understood that this invention is not limited to the specific embodiments thereof, except as defined in the appended claims.

The embodiments of the invention in which an exclusive property or privilege is claimed are defined as follows:

1. Compounds selected from the group consisting of (I) dicyanosulfonyl-p-benzoquinones of the formula

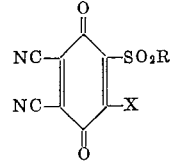

and (II) dicyanosulfonyl-p-hydroquinones of the formula

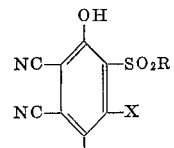

wherein R in each formula represents a radical, free from aliphatic carbon-to-carbon unsaturation and selected from the class consisting of hydrocarbyl, halohydrocarbyl wherein said halogen is of atomic number 9–35 inclusive, cyanohydrocarbyl and nitrohydrocarbyl and X in each formula is a member of the class consisting of hydrogen, halogen, CN, $NO_2$, $RSO_2$, CHO, $CO_2H$, $CF_3$, and $N(CH_3)_3{}^+$, wherein R is as defined as above.

2. The dicyanosulfonyl-p-benzoquinones of claim 1 wherein R is hydrocarbyl and X is hydrogen.

3. The dicyanosulfonyl-p-benzoquinones of claim 1 wherein R is hydrocarbyl and X is $RSO_2$ wherein R is hydrocarbyl.

4. The dicyanosulfonyl-p-benzoquinones of claim 1 wherein R is hydrocarbyl and X is halogen.

5. The dicyanosulfonyl-p-hydroquinones of claim 1 wherein R is hydrocarbyl and X is hydrogen.

6. The dicyanosulfonyl-p-hydroquinones of claim 1 wherein R is hydrocarbyl and X is $RSO_2$ wherein R is hydrocarbyl.

7. The dicyanosulfonyl-p-hydroquinones of claim 1 wherein R is hydrocarbyl and X is halogen.

8. 2,3-dicyano-5-phenylsulfonyl-1,4-benzoquinone.

9. 2,3-dicyano - 5,6 - bis(phenylsulfonyl) - 1,4 - benzoquinone.

10. 5-chloro-2,3-dicyano-6-phenylsulfonyl - 1,4 - benzoquinone.

11. 2,3-dicyano-5-phenylsulfonyl-1,4-hydroquinone.

12. 2,3-dicyano - 5,6 - bis(phenylsulfonyl) - 1,4-hydroquinone.

13. 5-chloro-2,3-dicyano - 6 - phenylsulfonyl-1,4-hydroquinone.

References Cited by the Examiner

UNITED STATES PATENTS 3,102,124　8/1963　Mitchell ＿＿＿＿＿＿＿ 260—396
3,114,756　12/1963　Wallenfells ＿＿＿＿＿＿ 260—396

OTHER REFERENCES

Hinsberg: Ber., 27, 3259 (1894).
Hinsberg: Ber., 28, 1315 (1895).
Fieser: Organic Chemistry, 2d. ed., pp. 752–769 (1950).

LORRAINE A. WEINBERGER, *Primary Examiner.*

LEON ZITVER, *Examiner.*

D. P. CLARKE, R. K. JACKSON, *Assistant Examiners.*